United States Patent
Kim et al.

(10) Patent No.: US 8,229,374 B2
(45) Date of Patent: Jul. 24, 2012

(54) APPARATUS AND METHOD FOR CONTROLLING TRANSMIT POWER IN HUMAN BODY COMMUNICATION SYSTEM

(75) Inventors: Hyung-Tae Kim, Seoul (KR); Seong-Jun Song, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 443 days.

(21) Appl. No.: 12/473,756

(22) Filed: May 28, 2009

(65) Prior Publication Data

US 2009/0298447 A1 Dec. 3, 2009

(51) Int. Cl.
*H01Q 11/12* (2006.01)
*H04B 1/04* (2006.01)

(52) U.S. Cl. ............. 455/127.1; 455/95; 455/115.1

(58) Field of Classification Search .......... 330/61 R, 330/75–78, 85, 96, 102–105, 127–129, 205–311; 370/276–278, 282–284, 310, 315, 318, 328–336, 370/342; 455/91, 95, 100–101, 115.1–115.4, 455/127.1–127.5

See application file for complete search history.

(56) References Cited

U.S. PATENT DOCUMENTS

| | | | | |
|---|---|---|---|---|
| 5,907,261 | A | * 5/1999 | Jones | 330/254 |
| 2007/0190940 | A1 | 8/2007 | Lee et al. | |
| 2007/0285170 | A1 | * 12/2007 | Mujtaba et al. | 330/285 |
| 2008/0123599 | A1 | * 5/2008 | Ishibashi et al. | 370/335 |

FOREIGN PATENT DOCUMENTS

WO 2007/148877 A1 12/2007

* cited by examiner

*Primary Examiner* — Christian Hannon
(74) *Attorney, Agent, or Firm* — Jefferson IP Law, LLP

(57) ABSTRACT

An apparatus and method for controlling Transmit (Tx) power when a portable terminal performs human body communication with a counterpart portable device are provided. The apparatus includes a voltage manager for determining whether the Tx power needs to be changed based on an output voltage that is based on a current that varies according to a distance between an electrode of a portable terminal and an electrode of a counterpart portable terminal, and changes the Tx power according to a result of the determination.

15 Claims, 4 Drawing Sheets

APPARATUS AND METHOD FOR CONTROLLING TRANSMIT POWER IN HUMAN BODY COMMUNICATION SYSTEM

PRIORITY

This application claims the benefit under 35 U.S.C. §119(a) of a Korean patent application filed in the Korean Intellectual Property Office on May 28, 2008 and assigned Serial No. 10-2008-0049494, the entire disclosure of which is hereby incorporated by reference.

BACKGROUND OF THE INVENTION

1. Field of the Invention

The present invention relates to an apparatus and method in which a portable terminal establishes a connection for communication with a counterpart portable device. More particularly, the present invention relates to an apparatus and method for controlling Transmit (Tx) power when a portable terminal establishes a connection for communication with a counterpart portable device for human body communication.

2. Description of the Related Art

Presently, information can be exchanged anytime nearly anywhere, and thus there is a growing interest in a Personal Area Network (PAN) through which an individual user can collect and process a variety of data from portable terminals within the user's vicinity. To satisfy this interest, the number of personal area terminals (i.e., portable terminals) carried by the individual user or encountered within a given vicinity is increasing. Accordingly, information exchange is more frequently being carried out between the portable terminals.

To exchange data between the portable terminals, the portable terminals are conventionally connected in a wired fashion. The conventional communication method has a disadvantage in that not only may the cables be entangled, but also users have to inconveniently carry the cables. Accordingly, various wireless communication methods (i.e., Bluetooth, IrDA, ZigBee, UWB, etc.) have already been commercialized or are currently being developed for connections between personal region devices, i.e., portable terminals.

For example, in a Bluetooth communication connection process of the portable terminal, the portable terminal equipped with a Bluetooth module searches for connectable Bluetooth devices located near the portable terminal to use the Bluetooth devices for respective services. After searching for the connectable Bluetooth devices, the portable terminal generates a list of the Bluetooth devices that are found in the search. A user of the portable terminal selects a Bluetooth device to be connected from the generated list of the Bluetooth devices, and thereafter performs a communication connection with the Bluetooth device.

Since the portable terminal is connected to various counterpart portable devices by using multiple connections, a large number of connections are supported. As a result, a problem arises in that a process of connecting the portable terminal and the counterpart portable device is becoming more complicated.

When the portable terminal performs a communication connection with the portable device, a communication method for connecting the portable terminal and the counterpart portable device has to be selected, and a portable device supporting the selected communication method has to be searched for. A counterpart portable device in a receiving side can also perform a communication connection by performing the same process used in the portable terminal.

When a user intends to connect the portable terminal and the counterpart portable device, the user has to perform several operations, which leads to user inconvenience. To address this problem, there is ongoing research on human body communication in which information can be exchanged by using a human body as a medium according to a dielectric property of the human body rather than using wired or wireless communications.

FIG. 1 is a diagram illustrating a process of performing a communication connection by using human body communication in a conventional mobile communication system.

The human body communication is a technique for implementing data communication by using a human body 100 rather than cables. The technique includes a method of connecting a transmitting apparatus 110 and a receiving apparatus 120 by using changes in current flowing within a human body or by using changes in a surface electric field.

The human body communication has a problem in that a Transmit (Tx)/Receive (Rx) sensitivity significantly differs according to an electrode distance. Herein, the electrode distance may be a distance to a body part on which human body communication is performed or a distance between electrodes based on the number of persons performing human body communication.

The human body communication has a problem in that Tx/Rx quality may vary according to a distance between a portable terminal and a counterpart portable device, which intend to establish a connection for communication via the human body, for example, a distance between the transmitting apparatus 110 and the receiving apparatus 120.

Accordingly, there is a need for an apparatus and method for controlling power to improve communication quality when the aforementioned human body communication is performed.

SUMMARY OF THE INVENTION

An aspect of the present invention is to address at least the above-mentioned problems and/or disadvantages and to provide at least the advantages described below. Accordingly, an aspect of the present invention is to provide an apparatus and method for improving communication quality of a portable terminal supporting human body communication.

Another aspect of the present invention is to provide an apparatus and method for improving communication quality by variably changing Transmit (Tx) power in a portable terminal supporting human body communication.

Still another aspect of the present invention is to provide an apparatus and method for reducing power consumption of a portable terminal by changing Tx power based on current flowing between a portable terminal supporting human body communication and a counterpart portable device for which a communication connection is performed.

In accordance with an aspect of the present invention, an apparatus for controlling Tx power in a human body communication system is provided. The apparatus includes a voltage manager for determining whether the Tx power needs to be changed based on an output voltage that is based on a current that varies according to a distance between an electrode of a portable terminal and an electrode of a counterpart portable terminal, and changes the Tx power according to a result of the determination.

In accordance with another aspect of the present invention, a method of controlling Tx power in a human body communication system is provided. The method includes determining whether the Tx power needs to be changed based on an output voltage that is based on a current that varies according to a distance between an electrode of a portable terminal and an electrode of a counterpart portable terminal, and changing the Tx power according to a result of the determination.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The following description relates to an apparatus and method for changing Transmit (Tx) power depending on current flowing between a portable terminal supporting human body communication and a counterpart portable device for which a connection for communication is established, to maintain sufficient communication quality of the portable terminal while minimizing transmission power.

Figure 1:
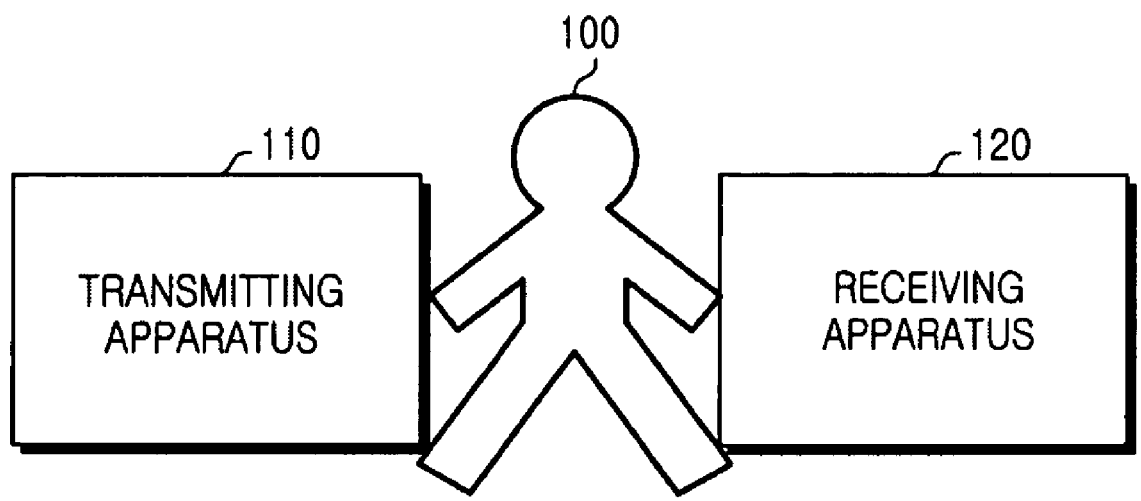
FIG. 1 is a diagram illustrating a process of performing a communication connection by using human body communication in a conventional mobile communication system.
Figure 2A:
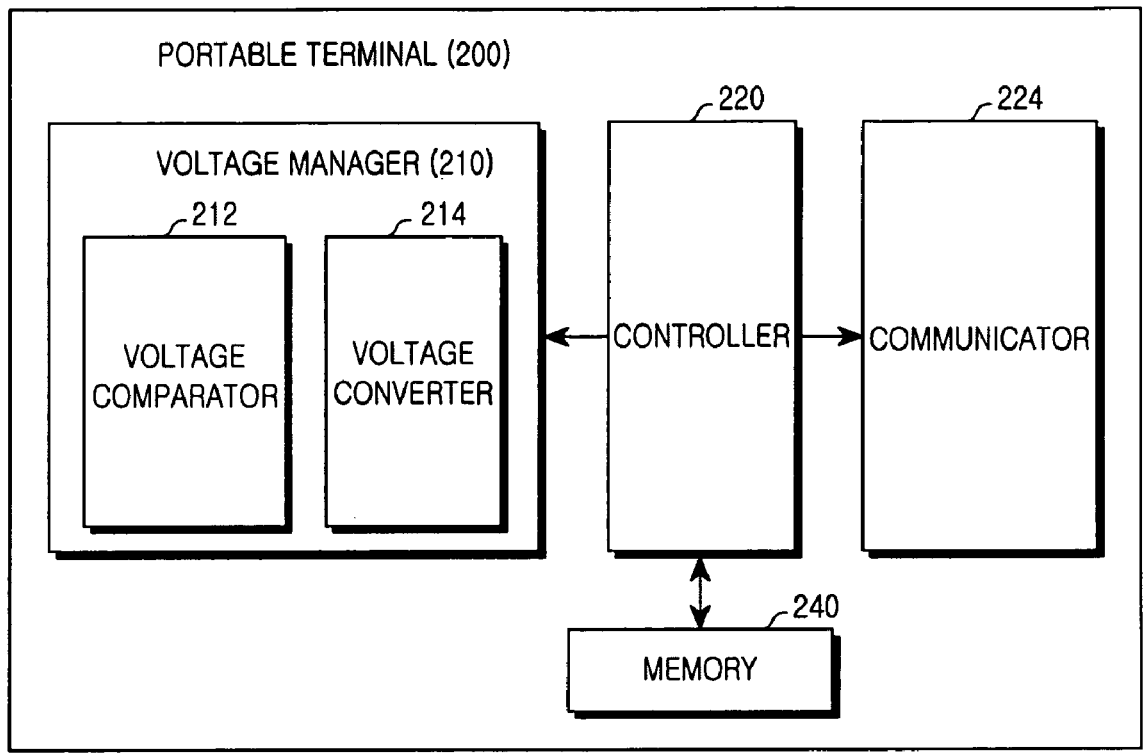
FIG. 2A is a block diagram illustrating a structure of a transmitting apparatus according to an exemplary embodiment of the present invention.
Figure 2B:
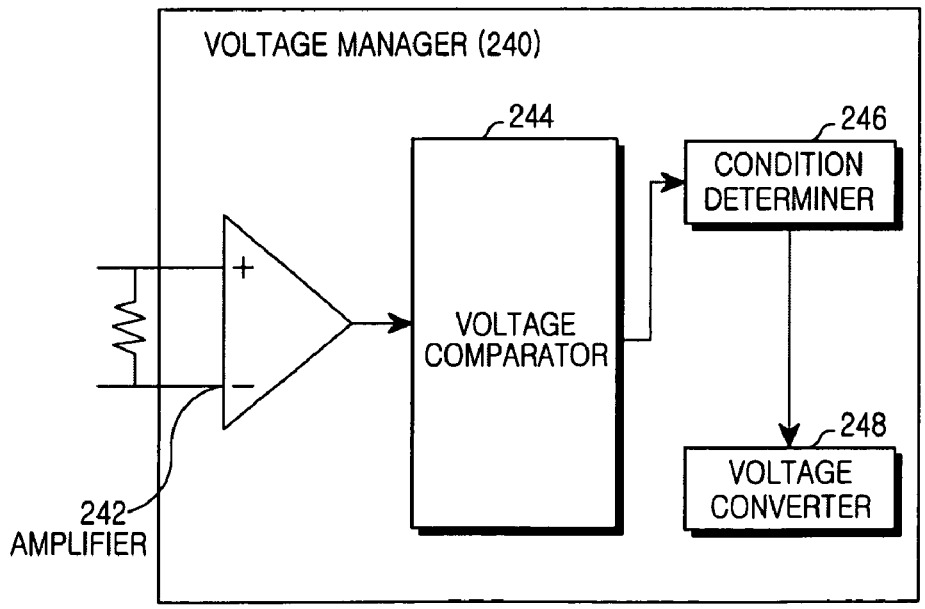
FIG. 2B is a block diagram illustrating a detailed structure of a voltage manager of a portable terminal according to an exemplary embodiment of the present invention.

FIGS. 2A and 2B are a block diagram illustrating a structure of a portable terminal for human body communication according to an exemplary embodiment of the present invention. The portable terminal is a mobile communication terminal, for example, a cellular phone, a Personal Communication System (PCS), a Personal Data Assistant (PDA), an International Mobile Telecommunication-2000 (IMT-2000), a $4^{th}$ generation broadband system, etc. A general structure of these exemplary portable terminals will be described hereinafter.

FIG. 2A is a block diagram illustrating a structure of a transmitting apparatus according to an exemplary embodiment of the present invention.

Referring to FIG. 2A, a portable terminal 200 includes a controller 220, a voltage manager 210, a memory 240, and a communicator 224. The voltage manager 210 includes a voltage comparator 212 and a voltage converter 214.

The controller 220 of the portable terminal 200 provides overall control of the portable terminal 200. For example, voice or data communication is processed and controlled by the controller 220. Further, in addition to general operations, when human body communication is performed, the controller 220 varies the Transmit (Tx) power of the portable terminal 200 based on current flowing between the portable terminal 200 and a counterpart portable device, (e.g., a receiving apparatus) between which a connection for communication is established.

The controller 220 controls the voltage manager 210 to regulate and process Tx power of the portable terminal 200.

The voltage manager 210 of the portable terminal 200 regulates Tx power of the portable terminal 200 under the control of the controller 220. When it is determined that Tx/Receive (Rx) sensitivity, which depends on an electrode distance, is poor in a human body communication process, that is, if human body communication is performed in a state where the portable terminal 200 is located far from the counterpart portable device, the voltage manager 210 increases the Tx power of the portable terminal 200 to increase communication performance. Otherwise, when it is determined that Tx/Rx sensitivity, which depends on the distance between electrodes, is good in the human body communication process, that is, if the portable terminal 200 is located near the counterpart portable device and thus it is determined that communication performance is good, the voltage manager 210 can reduce the Tx power of the portable terminal 200 to maintain satisfactory communication performance while reducing the amount of power used.

The voltage comparator 212 of the voltage manager 210 determines whether a condition for changing Tx power of the portable terminal 200 is satisfied by using a voltage of the portable terminal 200 according to the current flowing between the portable terminal 200 and the counterpart portable device. Herein, the current varies according to a distance between electrodes in human body communication.

The voltage converter 214 of the voltage comparator 212 regulates the Tx power of the portable terminal 200 upwards or downwards under the control of the voltage manager 210.

The memory 240 includes a Read Only Memory (ROM), a Random Access Memory (RAM), a flash ROM, and the like. The ROM stores a microcode of a program, by which the controller 220 is processed and controlled, and a variety of reference data (e.g., Tx power based on average output information).

The RAM may be a working memory of the controller 220 and stores temporary data that is generated while programs are being performed. The flash ROM stores various data which needs to be preserved and may be updated, such as a phone book, an outgoing message, an incoming message and the like.

The communicator 224 transmits/receives a Radio Frequency (RF) signal of data that is input/output through an antenna (not illustrated). For example, in a transmitting process, data to be transmitted is subject to a channel-coding process and a spreading process, and then the data is transformed to an RF signal. In a receiving process, the RF signal is received and transformed into a base-band signal, and the base-band signal is subject to a de-spreading process and a channel-decoding process, thereby restoring the data. According to an exemplary embodiment of the present invention, the communicator 224 receives data (i.e., Tx/Rx sensitivity based on the distance between electrodes) capable of determining a distance between the portable terminal and a counterpart portable device (e.g., a receiving apparatus).

The voltage manager 210 may operate under the control of the controller 220 of the mobile terminal 200. Although these elements 210 and 220 are separately configured in an exemplary embodiment of the present invention, this separate configuration is for explanation purposes only. Thus, those of ordinary skill in the art will understand that various modifications can be made within the scope of the present invention. For example, a function of the voltage manager 210 may be incorporated into the controller 220.

FIG. 2B is a block diagram illustrating a detailed structure of a voltage manager of a portable terminal according to an exemplary embodiment of the present invention.

Referring to FIG. 2B, the voltage manager 240 includes an amplifier 242, a voltage comparator 244, a condition determiner 246, and a voltage converter 248.

The voltage manager 240 measures current flowing between the portable terminal 200 and a counterpart portable device performing human body communication. Herein, the current varies according to a distance between electrodes in human body communication. The voltage manager 240 can measure the current by using a fixed resistance value and voltage of the portable terminal at that moment.

After measuring the current, the voltage manager 240 may control the amplifier 242 to amplify the voltage when current flowing through the resistor is very small.

The amplifier 242 of the voltage manager 240 amplifies an analog signal, which contains information on a voltage measured at the resistor, to determine whether to change Tx power of the portable terminal 200.

Thereafter, the voltage manager 240 allows the voltage comparator 244 to compare the voltage amplified by the amplifier 242 with a predefined threshold. The process of comparing the amplified voltage with the predefined threshold is a part of a process for determining whether a condition for changing Tx power of the portable terminal 200 is satisfied. For example, if the voltage comparator 244 determines that the voltage amplified by the amplifier 242 is greater than or equal to the predefined threshold, the Tx power is converted into a digital signal of a high level and otherwise, if the amplified voltage is less than the predefined threshold, the Tx power is converted into a digital signal of a low level.

The condition determiner 246 analyzes the digital signal converted by the voltage comparator 244 and determines whether the condition for changing the Tx power of the portable terminal 200 is satisfied. The condition determiner 246 may compare a number of bits, each of which indicates a level (high or low) among the total number of bits constituting a frame of the digital signal converted by the voltage comparator 244, with a predefined value and thus determine whether the condition for changing the Tx power is satisfied. For example, if the Tx power is converted by the voltage comparator 244 into a digital signal having a frame with a total length of 128 bits with 32 bits thereof indicating the level, the condition determiner 246 determines a digital signal whose frame includes 128 bits with 32 bits indicating the level is indicative of a high level. Accordingly, the condition determiner 246 compares the number of bits indicating the high level in the determined digital signal (i.e., 32) with a threshold (e.g., 64) that is a reference value for determining whether the Tx power needs to be changed. In this case, when it is determined that the number of bits indicating the high level in the digital signal is less than the predefined threshold, the condition determiner 246 may determine that the Tx power of the portable terminal 200 should be increased.

The voltage converter 248 increases or decreases the Tx power of the portable terminal 200 according to a result of the determination made by the condition determiner 246.

An exemplary apparatus for changing Tx power based on current flowing between a portable terminal supporting human body communication and a counterpart portable device, for which a connection is established to perform communication, to improve communication quality of the portable terminal, has been described above. Hereinafter, a method for changing Tx power based on current flowing between a portable terminal supporting human body communication and a counterpart portable device, for which a connection is established to perform communication, to improve communication quality of the portable terminal, will be described by using the aforementioned apparatus according to an exemplary embodiment of the present invention.

Figure 3:
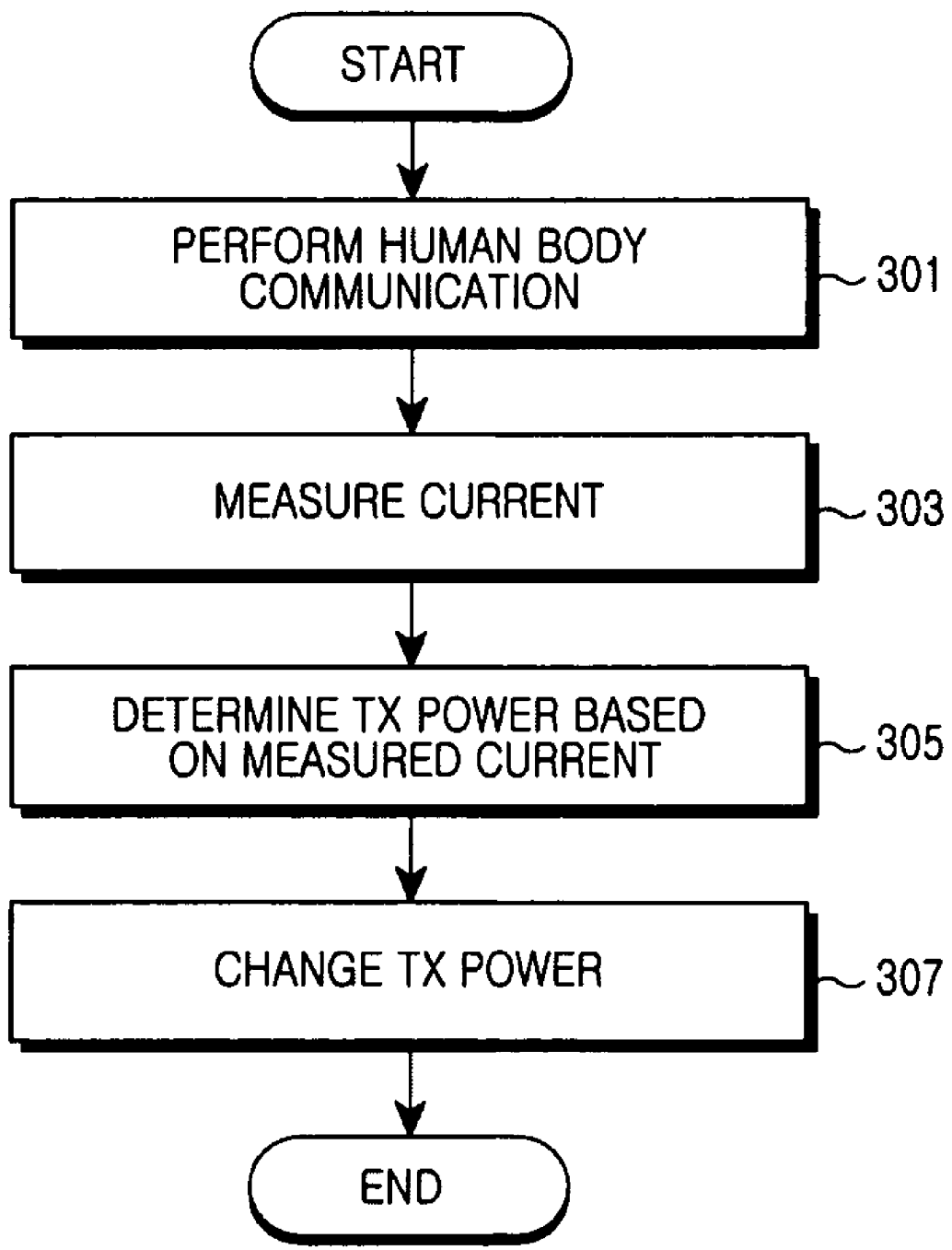
FIG. 3 is a flow diagram illustrating a process of performing human body communication in a portable terminal according to an exemplary embodiment of the present invention.

FIG. 3 is a flow diagram illustrating a process of performing human body communication in a portable terminal according to an exemplary embodiment of the present invention.

Referring to FIG. 3, the portable terminal 200 performs a human body communication process in step 301. Herein, the human body communication process is carried out by bringing the portable terminal 200 and a counterpart portable device, for which a user of the portable terminal 200 intends to perform a communication connection, in contact with a human body.

In step 303, the portable terminal 200 measures current flowing between the portable terminal 200 and the counterpart portable device for which the user intends to perform the communication connection. In step 305, the portable terminal 200 determines a Transmit (Tx) power corresponding to the current measured in step 303.

In step 307, the portable terminal 200 changes the Tx power of the portable terminal 200. The portable terminal 200 increases or decreases the Tx power of the portable terminal 200 according to the measured current.

After that, the portable terminal 200 ends the operation.

Figure 4:
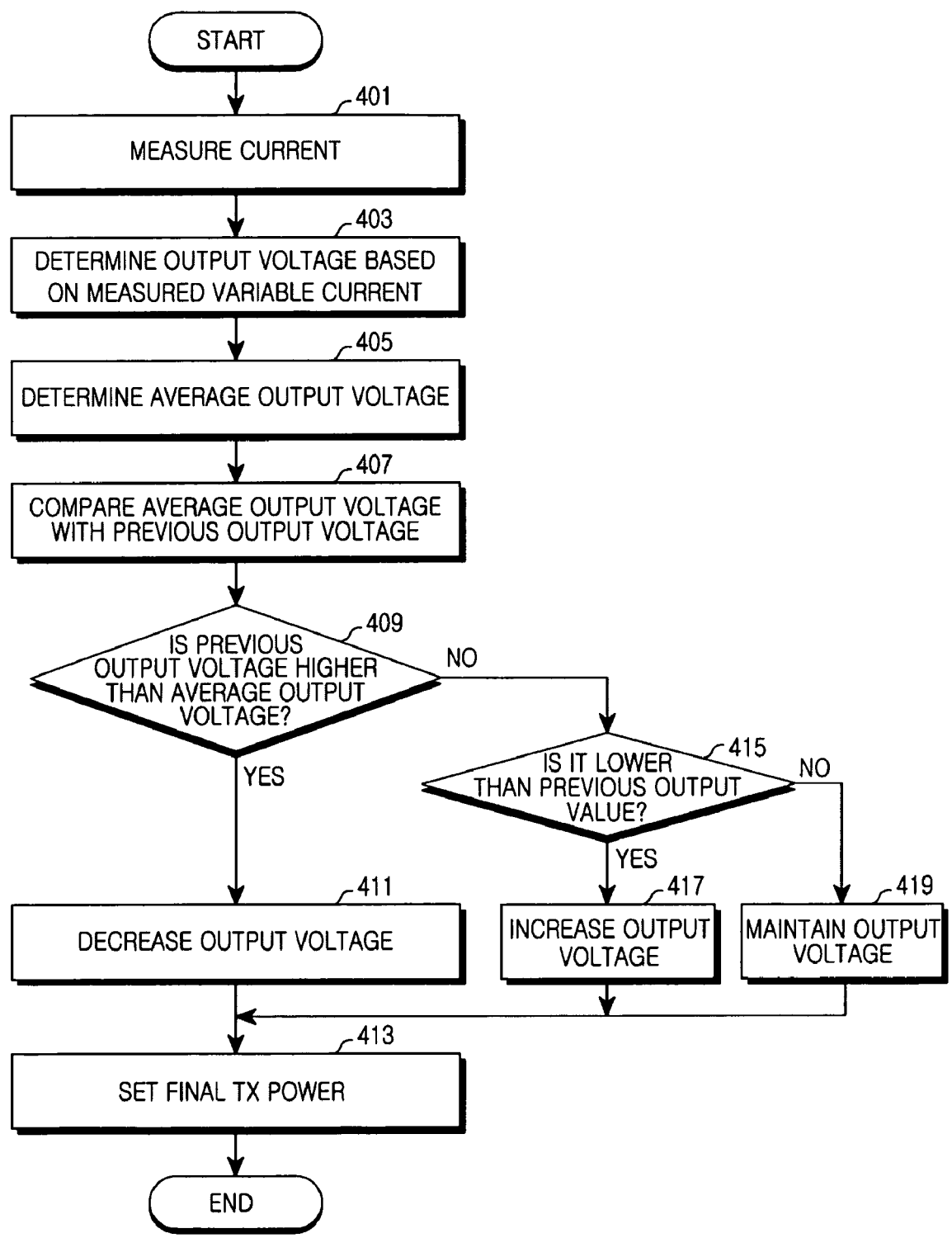
FIG. 4 is a flow diagram illustrating a process of performing human body communication in a portable terminal according to an exemplary embodiment of the present invention.

FIG. 4 is a flow diagram illustrating a process of performing human body communication in a portable terminal according to an exemplary embodiment of the present invention.

Referring to FIG. 4, it is assumed that the portable terminal 200 is performing human body communication by bringing the portable terminal 200 and a counterpart portable device in contact with a human body. According to this assumption, in step 401, the portable terminal 200 measures current flowing between the portable terminal 200 and the counterpart portable device for which the user intends to establish a connection for communication. Thereafter, in step 403, the portable terminal 200 determines an output voltage based on the current measured in step 401. In this case, the current varies according to a distance between electrodes, that is, a distance between body parts, on which the portable terminal 200 and the counterpart portable device are brought in contact, or a distance between electrodes based on the number of users performing human body communication. The portable terminal 200 may determine the output voltage by using a fixed resistance value and the current measured in step 401.

In step 405, the portable terminal 200 controls the voltage manager 210 to determine an average voltage of the portable terminal 200. Under the control of the portable terminal 200, the voltage manager 210 may determine the average voltage by performing the following operations.

In order to determine the average voltage, the voltage manager 210 amplifies the output voltage based on the measured current, and thereafter compares the amplified output voltage with a predefined threshold.

This is a part of the process for determining whether a condition for changing Transmit (Tx) power of the portable terminal 200 is satisfied. More specifically, if the amplified voltage is greater than or equal to the predefined threshold, the Tx power is converted into a digital signal of a high level and otherwise, if the amplified voltage is less than the predefined threshold, the Tx power is converted into a digital signal of a low level.

Thereafter, the voltage manager 210 determines the average output voltage by determining a number of bits, which indicates the level (high or low) among the total number of bits constituting a frame of the converted digital signal. For example, if the Tx power is converted into a digital signal having a frame with a total length of 128 bits with 32 bits indicating the level, the voltage manager 210 determines that the number of bits indicates a high level (i.e., average output voltage). In this case, the voltage manager 210 can determine the average output voltage by using a total number of (or a ratio of) bits indicating the level in the digital signal.

After determining the average output voltage as described above, the portable terminal 200 compares the determined average output voltage with a predefined threshold in step 407. Herein, the predefined threshold to be compared with the average output voltage may be an average output voltage used when Tx power is determined or may be a default value determined in the portable terminal.

After performing the comparison process, the portable terminal 200 determines a result of the comparison of the average output voltage in step 409. When it is determined in step 409 that the average output voltage is higher than the threshold, the portable terminal 200 determines that the output voltage (or Tx power) of the portable terminal 200 needs to be decreased in step 411.

When it is determined in step 409 that the average output voltage is lower than the threshold, the portable terminal 200 evaluates whether the average output voltage is lower than the threshold in step 415. When it is determined in step 415 that the average output voltage is lower than the threshold, the portable terminal 200 determines that the Tx power of the portable terminal 200 needs to be increased in step 417.

In addition, if the average output voltage is equal to the threshold in step 415, the portable terminal 200 determines that the Tx power of the portable terminal 200, i.e., the Tx power currently set in the portable terminal 200, needs to be maintained in step 419.

The portable terminal 200 can regulate Tx power based on the average output voltage of the portable terminal 200 by using a power table defined in Table 1 below.

TABLE 1

|         | 5.0 v | 4.0 v | 2.5 v | 1.8 v | 1.2 v |
|---------|-------|-------|-------|-------|-------|
| A (10%) | 1     |       |       |       |       |
| B (20%) |       | 2     |       |       |       |
| C (30%) |       |       | 3     |       |       |
| D (40%) |       |       |       | 4     |       |
| E (50%) |       |       |       |       | 5     |

For example, when the average output voltage "B" is determined by the portable terminal 200 (e.g., when a digital signal is determined to have 32 bits, which indicates a high level among 128 bits constituting a frame, a probability of having the high level is about 25%), the portable terminal 200 compares the average output value with a predefined threshold.

If the average output voltage is less than or equal to the threshold, the portable terminal 200 may determine that the Tx power of the portable terminal 200 needs to be increased and thus may increase the Tx power of the portable terminal 200 to 4.0 volts.

After varying or maintaining the Tx power of the portable terminal 200 as described above, the portable terminal 200 sets the Tx power to a final Tx power of the portable terminal 200 in step 413.

After that, the portable terminal 200 ends the operation.

According to exemplary embodiments of the present invention, communication quality can be improved and power consumption can be reduced by changing Tx power based on current flowing between a portable terminal supporting human body communication and a counterpart portable device, for which a connection is established for communication, to improve communication quality of the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling Transmit (Tx) power in a human body communication system, the apparatus comprising:
   a voltage manager for changing the Tx power of a portable terminal according to a distance between the portable terminal and a counterpart portable terminal by determining whether the Tx power needs to be changed based on an output voltage that is based on a current that varies according to a distance between an electrode of the portable terminal and an electrode of the counterpart portable terminal and changing the Tx power according to a result of the determination,
   wherein the portable terminal and the counterpart portable terminal communicate via the human body, and wherein the current varies according to the distance between the electrodes corresponding to a distance between body parts on which the portable terminal and the counterpart portable terminal are brought in contact, or a distance between electrodes based on the number of users performing human body communication.

2. The apparatus of claim 1, wherein the voltage manager compares an average of the output voltage with a first threshold, and determines whether the Tx power needs to be changed based on a result of the comparison.

3. The apparatus of claim 2, wherein the voltage manager determines that the Tx power needs to be decreased if the average output voltage is higher than the first threshold, determines that the Tx power needs to be increased if the average output voltage is less than the threshold, and determines that the Tx power needs to be maintained if the average output voltage is equal to the threshold.

4. The apparatus of claim 2, wherein the voltage manager amplifies the output voltage to be compared the amplified output voltage with a second threshold to determine the average of the output voltage.

5. The apparatus of claim 4, wherein the average of the output voltage is determined by converting the result of the comparison between the amplified output voltage and the second threshold into a digital signal.

6. The apparatus of claim 5, wherein the voltage manager converts the result of the comparison between the amplified output voltage and the second threshold into the digital signal such that a bit of the digital signal indicates a high level when the amplified output voltage is higher than the second threshold, and a bit of the digital signal indicates a low level when the amplified output voltage is less than the second threshold.

7. The apparatus of claim 6, wherein the voltage manager determines the average output voltage by using one of a total number of bits indicating the high level in the digital signal and a ratio of bits indicating the high level in the digital signal.

8. The apparatus of claim 1, wherein the voltage manager measures the current using a resistance value and a voltage value of the portable terminal.

9. A method of controlling Transmit (Tx) power in a human body communication system, the method comprising:
changing, by a voltage manager, the Tx power of a portable terminal according to a distance between the portable terminal and a counterpart portable terminal, wherein the portable terminal and the counterpart portable terminal communicate via the human body by determining whether the Tx power needs to be changed based on an output voltage that is based on a current that varies according to a distance between an electrode of the portable terminal and an electrode of the counterpart portable terminal and changing the Tx power according to a result of the determination,
wherein the current varies according to the distance between the electrodes corresponding to a distance between body parts on which the portable terminal and the counterpart portable terminal are brought in contact, or a distance between electrodes based on the number of users performing human body communication.

10. The method of claim 9, wherein the determining of whether the Tx power needs to be changed based on the output voltage comprises:
determining an average of the output voltage; and
comparing the determined average output voltage with a predefined threshold.

11. The method of claim 10, wherein the determining of whether the Tx power needs to be changed based on the output voltage further comprises:
determining that the Tx power needs to be decreased if the comparison result shows that the average output voltage is higher than the threshold;
determining that the Tx power needs to be increased if the comparison result shows that the average output voltage is less than the threshold; and
determining that the Tx power needs to be maintained if the comparison result shows that the average output voltage is equal to the threshold.

12. The method of claim 10, wherein the determining of the average output voltage comprises:
amplifying the determined output voltage;
comparing the amplified output voltage with the threshold; and
converting the comparison result between the amplified output voltage and the second threshold into a digital signal.

13. The method of claim 12, wherein the converting of the comparison result into the digital signal comprises:
converting the comparison result into a digital signal such that a bit of the digital signal indicates a high level when the amplified output voltage is higher than the second threshold; and
converting the comparison result into a digital signal such that a bit of the digital signal indicates a low level when the amplified output voltage is less than the second threshold.

14. The method of claim 13, wherein the average output voltage is determined to be higher than the threshold if the number of bits indicating the high level in the digital signal is greater than a predefined specific value, and the average output voltage is determined to be lower than the threshold if the number of bits indicating the high level in the digital signal is less than the predefined specific value.

15. The method of claim 9, wherein the current is measured using a resistance value and a voltage value of the portable terminal.

* * * * *